R. C. HOLMES.
DEVICE FOR PACKING EGGS.
APPLICATION FILED NOV. 2, 1909.

969,954.

Patented Sept. 13, 1910.

Witnesses
Mason B. Lawton

Inventor
Rush C. Holmes,
By C A Snow & Co
Attorneys

UNITED STATES PATENT OFFICE.

RUSH C. HOLMES, OF NORTH BEND, OREGON.

DEVICE FOR PACKING EGGS.

969,954.

Specification of Letters Patent. Patented Sept. 13, 1910.

Application filed November 2, 1909. Serial No. 525,975.

*To all whom it may concern:*

Be it known that I, RUSH C. HOLMES, a citizen of the United States, residing at North Bend, in the county of Coos and State of Oregon, have invented a new and useful Device for Packing Eggs, of which the following is a specification.

It is the object of this invention, generally, to provide a device for packing eggs, adapted to inclose an egg closely, to exclude the air therefrom, the device being so constructed that the egg may readily be inserted thereinto, the opening automatically closing, and sealing the egg within the device.

With these and other objects in view, the invention consists in the novel construction and arrangement of parts hereinafter described, delineated in the accompanying drawings, and specifically claimed, it being understood, that, within the scope of what hereinafter thus is claimed, divers changes in the form, proportions, size, and minor details of the structure may be made, without departing from the spirit of the invention.

Similar numerals of reference are employed to denote corresponding parts throughout the several figures of the drawings, wherein,—

Figure 1:
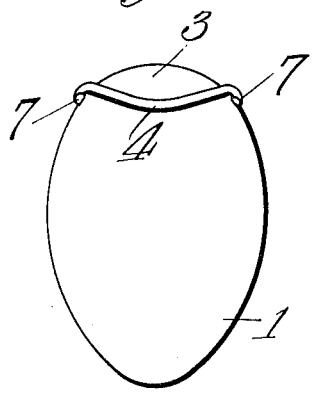
Figure 2:
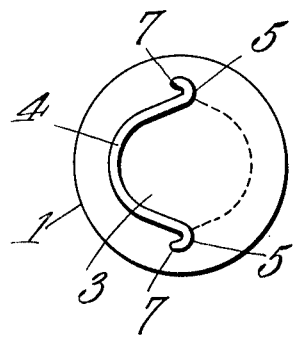
Figure 3:
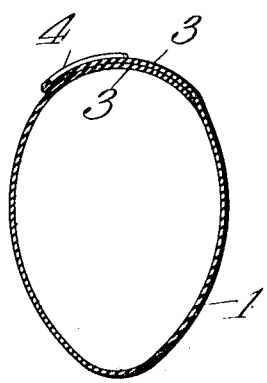
Figure 4:
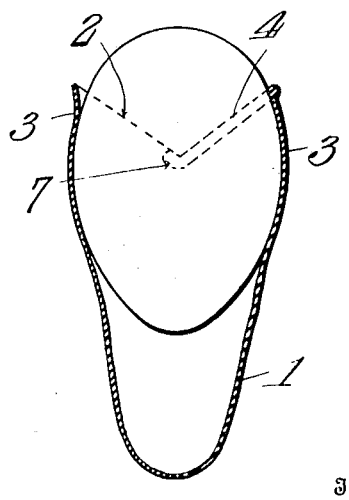

Figure 1 is a side elevation; Fig. 2 is a top plan; Fig. 3 is a longitudinal section, the lips being closed upon the egg; and Fig. 4 is a longitudinal section, the lips being distended, and the egg being partially introduced therebetween.

The invention consists of a resilient sack 1, preferably fashioned from rubber, and, in shape, approximating that of an egg. The sack 1 is provided at any suitable point, preferably at one end, with an opening 2, normally closed by two lips 3, adapted to overlap. One of these lips 3 is provided adjacent its edge, with an outstanding, reinforcing rib 4, which is terminally extended upon the body of the sack 1 as denoted by the numeral 5, the lips 3 and the rib 4 being fashioned integrally with the body of the sack 1.

In practical operation, the lips 3 are separated to form an opening into the sack, and into this opening, the egg is inserted. The lips 3 are then released, whereupon they will fall into overlapping relation, completely sealing the opening 2 in the sack, an effective closure being produced, primarily, through the resiliency of the lips 3, this resiliency being greatly enhanced by the rib 4.

From the foregoing it will be seen that I have provided an egg-container into which an egg may be readily inserted, the container automatically closing to house the egg from the air, the egg, when so housed, being capable of being preserved for a long time.

As shown in Fig. 1 of the drawings, and indicated most clearly in Fig. 4, the rib 4 is extended, as denoted by the numeral 7, to points beyond the union of the lips 3. Referring still to Fig. 4, it will be seen that these portions 7 of the rib, prevent the sack from tearing downwardly, when the lips are distended, for the reception of the egg.

Having thus described the invention what is claimed is:—

An egg-container consisting of a sack having an opening for the reception of an egg, said opening being normally closed by resilient, overlapping lips formed integrally with the sack, one of said lips being provided, adjacent its edge, with an integral reinforcing rib terminally extended upon the body of the sack to points beyond the union of the lips.

In testimony that I claim the foregoing as my own, I have hereto affixed my signature in the presence of two witnesses.

RUSH C. HOLMES.

Witnesses:
A. E. SHUSTER,
E. P. ANDERSON.